US008252459B2

(12) United States Patent
Stevenson et al.

(10) Patent No.: US 8,252,459 B2
(45) Date of Patent: Aug. 28, 2012

(54) CYCLOOCTATETRAENE-BASED CATHODE FOR ELECTROCHEMICAL CELLS

(76) Inventors: Cheryl D. Stevenson, Bloomington, IL (US); John Perrin Davis, Bloomington, IL (US)

( * ) Notice: Subject to any disclaimer, the term of this patent is extended or adjusted under 35 U.S.C. 154(b) by 157 days.

(21) Appl. No.: 12/800,296

(22) Filed: May 12, 2010

(65) Prior Publication Data

US 2010/0288628 A1 Nov. 18, 2010

Related U.S. Application Data

(60) Provisional application No. 61/216,299, filed on May 16, 2009.

(51) Int. Cl.
*H01M 4/60* (2006.01)
(52) U.S. Cl. ............ 429/213; 429/212; 429/231.9; 429/231.95; 429/218.1; 204/294
(58) Field of Classification Search .......... 204/294; 429/231.95, 231.9, 212, 213, 218.1
See application file for complete search history.

(56) References Cited

U.S. PATENT DOCUMENTS 5,516,598 A * 5/1996 Visco et al. ............ 429/213
2002/0016474 A1 2/2002 Weber et al.

FOREIGN PATENT DOCUMENTS

WO WO 96/03778 A2 2/1996

OTHER PUBLICATIONS

Renuka R. "1,4-Dinitrocyclooctatetraene: A wonder material for battery applications" J. of the Electrochemical Soc. of India, 2001, vol. 50, No. 1, pp. 35-36.
Stevenson. C. D.; Reiter, R. C.; Szczepura, L. F.; Peters, S. J "Polycyda-octatetraeneoxy Alkane Polyanionic Polyradicals," J. Am. Chem. Soc. 2005, 127, 421.
Stevenson, C. D,; Fico, R. M.; Reiter, R. C., "Does the Aromatic Dianion of 1,-Di-13C-[8]annulene Automerize As Does 1,2-Di-13C-benzene?" J. Org. Chem. 1998, 63, 4444.
Stevenson, C. D.; Kim, Y. S. "Observation of Both Jahn-Teller Distorted Forms (b1g and b2g) of the Cyclooctatetraene Anion Radical in a 1,2-Disubstituted System." J. Am. Chem. Soc. 2000. 122, 3211.
Kiesewetter, M. K.; Reiter, R. C.; Stevenson, C. D. "The Second Cyclopropannulene: Cycloprop-[8] annulene," J. Am. Chem. Soc. 2005, 127, 1118-1119.
Peters, S. J.; Reiter, R. C.; Stevenson, C. D. "Intraannular Communication in the Anion of Bis-Cyclooctatetraene Systems," Org. Lett. 2003, 5, 937-940.
Peters, S. J.; Turk, M. R.; Kiesewetter, M. K.; Stevenson, C. D. "Single ELectron Entrapment of [8]annulyne, Biannulenylenes and an Annulenoannulene." J. Am. Chem. Soc. 2003, 125. 11264-11268.
Nakiahara K.; Iwasa, S. et al., Chem. Phys., Lett., 2002, 359, 351.
Goodenough, J. et al. "Basic Research Needs for Electrical Energy Storage" Report of the Basic Energy Sciences Workshop on Electrical Energy Storage Apr. 2-4, 2007, 1-86.
Patoux, S. et al. Electrochimica Acta., 2008, 53, 4137-4145.
Amatucci, G. et al., "Report of a National Science Foundation-Intelligence Communicty Workshop" Chantilly, Va, Apr. 24-25, 2007.
Yoo, E. et al. Nano Lett., 2008, 8, 2277-2282.
Kang, B. and Ceder, G. Nature, 2009, 458, 190-193.
Marsella et al., "Towards Single-Molecule Electromechanical Actuators," WW-EAP Newsletter, vol. 1 No. 2, pp. 15-16, Dec. 1999, p. 15-16.
Stevenson, C. D.; Reiter, R. C.; Szczepura, L. F.; Peters, S. J. "Polycyclo-octatetraeneoxy Alkane Polyanionic Polyradicals," J. Am. Chem. Soc. 2005, 127, 421.
Stevenson, C. D.; Fico, R. M.; Reiter, R. C., "Does the Aromatic Dianion of 1,-Di-13C-[8]annulene Automerize As Does 1,2,-Di-13C-benzene?" J. Org. Chem. 1998, 63, 4444.
Stevenson, C. D.; Kim, Y. S. "Observation of Both Jahn-Teller Distorted Forms (b1g and b2g) of the Cyclooctatetraene Anion Radical in a 1,2-Disubstituted System," J. Am. Chem. Soc. 2000, 122, 3211.
Kiesewetter, M. K.; Reiter, R. C.; Stevenson, C. D. "The Second Cyclopropannulene: Cycloprop-[8] annulene." J. Am. Chem. Soc. 2005, 127, 1118-1119.
Peters, S. J.; Reiter, R. C., Stevenson, C. D. "Intraannular Communicatioin in the Anion of Bis-Cyclooctatetraene Systems," Org. Lett. 2003, 5, 937-940.
Peters, S. J.; Turk, M. R.; Kiesewetter, M. K.; Stevenson, C. D. "Single Electron Entrapment of [8]annulyne, Biannulenylenes, and an Annulenoannulene," J. Am. Chem. Soc. 2003, 125, 11264-11268.
Amatucci, G. et al., "Report of a National Science Foundation-Intelligence Community Workshop" Chantilly, Va, Apr. 24-25, 2007.

* cited by examiner

*Primary Examiner* — Bruce Bell
(74) *Attorney, Agent, or Firm* — Fenningham, Stevens & Dempster LLP; David P. Fitzgibbon, Esq

(57) ABSTRACT

A new invention in cathode composition, arrangement, and design for primary and secondary batteries that offers high power, high capacity, and high specific energy is proposed herein. The claimed technology described herein incorporates materials into the cathode that results in a cathode which may accept two electrons per active site. Other advantages of the technology included herein include: 1) lower cost, 2) environmental friendliness, 3) safety, 4) a wide operational temperature range, 5) backwards compatibility with present electrochemical cells, and 6) versatility. The technology is cross-cutting, and has high impact applications, such as for electric vehicles, which require both high power and high specific energy.

38 Claims, 5 Drawing Sheets

1. volt meter
2. Anode Material
(Li, Li-graphene,
Na, K, Ca, Mg, etc)
3. Fluid or Gel Electrolyte and Solvent System
4. Electrode Material (Cu, Al, etc.)
5. Anode Compartment
6. Cathode Compartment
7. Separator membrane
8. This area (cathode compartment) filled with COT-based cathode materials.

2. Here, the anode material is lithium.

9. •⁺ represents lithium ion, and the small arrow shows vector of motion.

CYCLOOCTATETRAENE-BASED CATHODE FOR ELECTROCHEMICAL CELLS

CROSS-REFERENCE

A Provisional Patent Application covering the below described invention was submitted, via Express Mail, which bore label number EH 716060434 US, and was assigned application No. 61/216,299. The inventors claim the priority date of said Provisional Patent Application.

GOVERNMENT RIGHTS

Not Applicable.

BACKGROUND

The present invention relates to electrochemical cells. An electrochemical cell is comprised of two or more half-cells. In most, but not all electrochemical cells, each half-cell is separated by a semi-permeable membrane. For a simple electrochemical cell, the two half-cell compartments are synonymous with the anode and cathode. For any two half-cell compartment electrochemical cell to be able to provide electrical energy, the Gibbs free energy for the overall reaction has to be negative, and the electrochemical reactions, at both the anode and cathode, have to occur at an appreciable rate to be practicable.

In order for the electrochemical cell to provide electrical energy, an outside path, commonly referred to as a circuit, must be provided through which electrons may flow. A completed circuit, in which electrons flow from the anode to the cathode through the circuit, is obtained by interfacing an electrical conductor of an uninterrupted circuit at contacts on both the anode and cathode. These contact points are commonly referred to as terminals of the anode electrode, and cathode electrode, respectively. Concomitantly, ions contained in the electrolyte solution flow between the anode and cathode to maintain a balance of charge. In the invention claimed within, the electrical energy provided is significantly augmented in both voltage potential and capacity in accordance with Hückel's rule for aromaticity for the cathode material.

Hückel's rule identifies aromatically stabilized compounds by using the number of $\pi$ electrons in an all carbon cyclic compound with alternating double and single bonds (such systems are referred to as annulenes). If the $\pi$ electron count, in an annulene, equals $4n+2$ where n is zero or any positive integer, then the compound is aromatic. The opposite of aromatically stabilized compounds are known as antiaromatic compounds. Hückel's rule predicts antiaromatic compounds will occur when the number of $\pi$ electrons equals $4n$ where n is zero or any positive integer. Antiaromatic annulenes have higher energies (and hence, instabilities) than do aromatic compounds; this is true in both experiment and in theory. This antiaromatic instability often causes a distortion in the cyclic molecule (annulene) resulting in non-planarity.

The addition of a single electron to an antiaromatic annulene ($4n$ $\pi$-electron system) results in an approach to aromaticity, although just one electron will not technically lead all the way to aromaticity. Thus, adding or removing even one electron to some cyclic compounds can have a dramatic effect upon the stability and shape of that annulene. Likewise, adding, or removing even one electron from a $4n+2$ $\pi$ electron system can also have a marked effect upon the stability and shape of that molecule.

As a consequence of the $4n+2$ $\pi$-electron rule, the cyclooctatetraene ("COT") moiety, more fully outlined below, which contains $4n$ $\pi$-electrons, is a very strong electron acceptor. COT (or [8]annulene) is an eight membered ring moiety that is herein being exploited as the basis for the proposed cathode systems. The COT moiety readily accepts the first electron, going from eight to nine $\pi$-electrons, with a voltage potential of approximately 1.8 V (in HMPA vs. Li/Li$^+$). The very large potential is due to the approach to aromatic character. This voltage varies somewhat dependent upon the solvent/electrolyte system. A second electron is accepted with a voltage potential of approximately 1.46 V (in HMPA vs. Li/Li$^+$), where upon the annulene becomes aromatic with $4n+2$ $\pi$-electrons.

The neutral ($4n$ $\pi$-electron) COT moiety is distorted from planarity and exists in a tub conformation. In this way the COT moiety avoids planar anti-aromatic character. The addition of a single electron forces the COT system into a planar ($D_{4h}$) conformation. The second electron forces the now fully aromatic annulene into a planar $D_{8h}$ conformation.

It is important to note that this system has a very high capacity for accepting electrons, since the COT moiety can reversibly accept two electrons per unit molecule. In terms of specific capacity (capacity per unit mass), COT reacting with lithium to yield COT-Li$_2$ represents a theoretical capacity of approximately 450 A-hrs/kg. This capacity far exceeds other reversible lithium (and lithium ion) cathode technologies. The theoretical specific energy is simply the product of the specific capacity and average voltage (here, it is taken to be 1.63 V), such that the COT-Li$_2$ system represents approximately 740 W-hrs/kg. Moreover, by accepting two electrons, the COT moiety and substituted COT moieties can achieve enormous thermodynamic stability and the attributes of aromatic systems. This high stability of COT-Li$_2$ (the COT moiety here has 10 $\pi$-electrons) can be demonstrated by its persistence at elevated temperatures, which can exceed 400° C.

For the foregoing reasons there is a need for an electrochemical cell which incorporates a new cathode material, in which redox (oxidation-reduction) couples rapidly and reversibly exchange multiple electrons in a narrow potential range to provide the electrochemical cell with high voltage, high energy, and high power.

SUMMARY

The above listed applicants have identified a solution to the need for an electrochemical cell which incorporates a new material, in which redox (oxidation-reduction) couples rapidly and reversibly exchange multiple electrons in a narrow potential range to provide the electrochemical cell with high voltage, high energy, and high power. An electrochemical cell having features of the present invention comprises a cathode, which includes a molecule, where the molecule contains at least one cyclooctatetraene ("COT") moiety; an anode; where the anode and cathode are separated by an electrolyte. The COT moiety may be succinctly described as [8]annulene, which has the common name of cyclooctatetraene, and analogues that have this 8-membered component.

DRAWINGS

These and other features, aspects and advantages of the present invention will become better understood with reference to the following description, appended claims and accompanying drawings where:

DESCRIPTION

Figure 1:
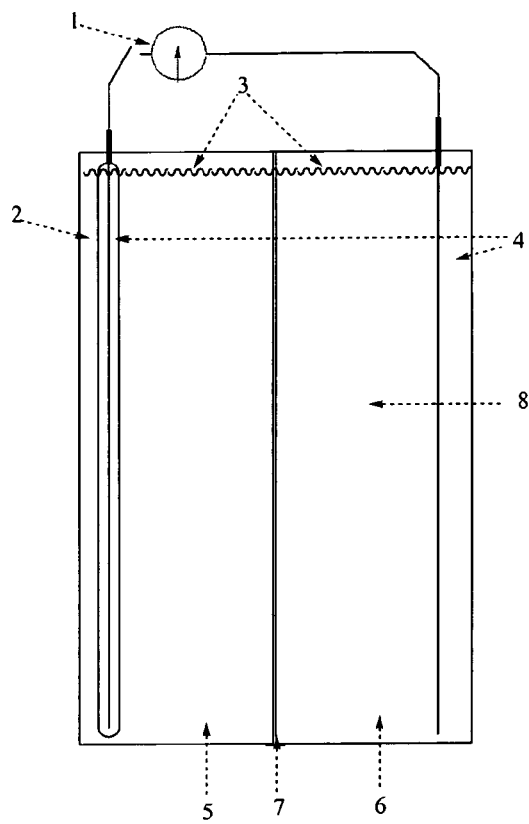
FIG. 1 shows a version of an electrochemical cell representation for the COT based cathode in a fully charged state with a broken circuit.
Figure 2:
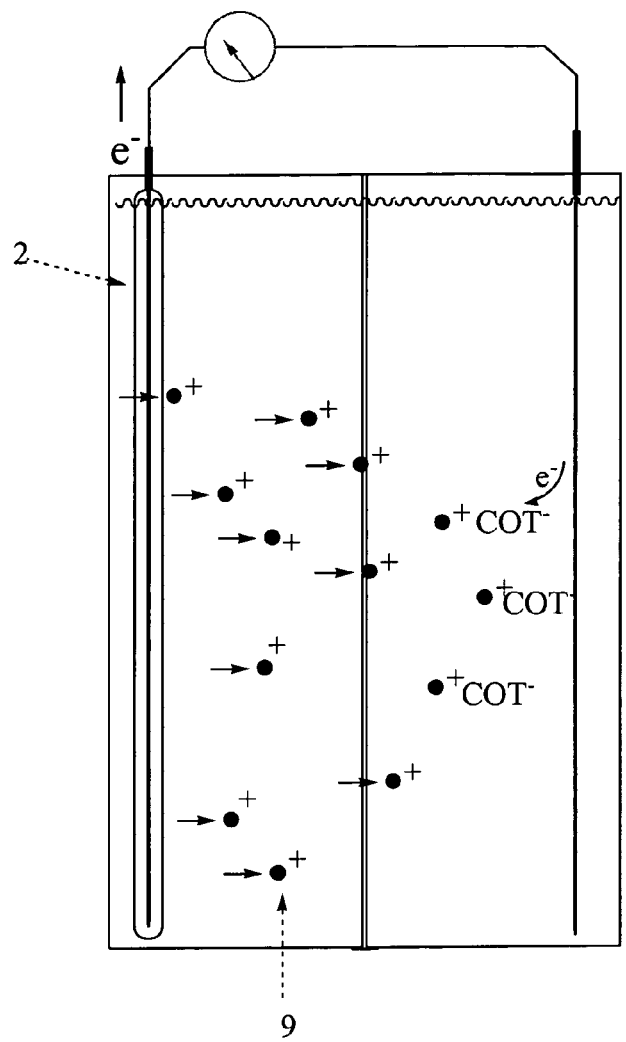
FIG. 2 shows a version of an electrochemical cell representation for the COT based cathode at early state of discharge wherein the cathode consists of mostly neutral COT, with some COT anion forming, and also some COT dianion forming.
Figure 3:
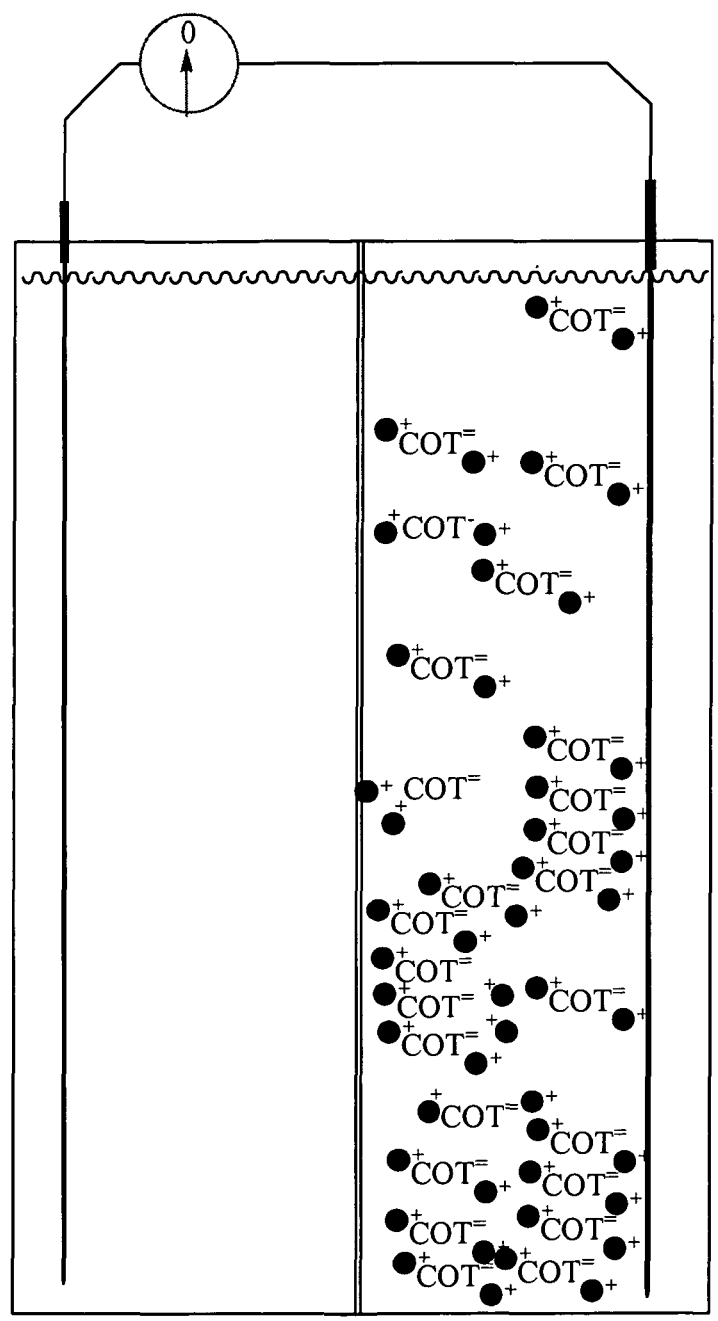
FIG. 3 shows a version of an electrochemical cell representation for the COT based cathode where the battery is fully discharged, and the COT exists as its corresponding dianion.
Figure 4:
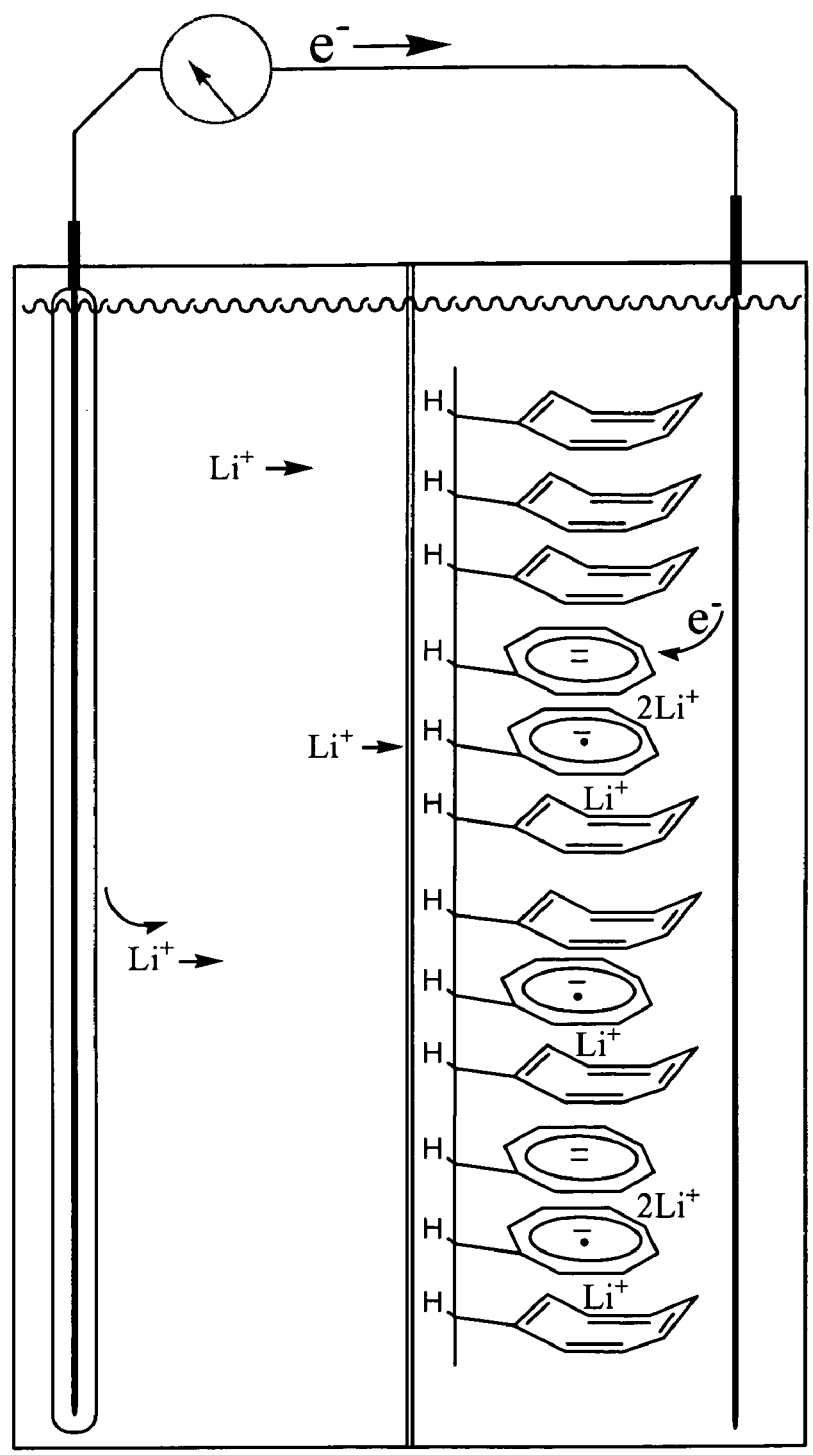
FIG. 4 shows a version of an electrochemical cell representation for the COT based cathode at very early state of discharge where a COT-based cathode polymer is shown as an example material in the cathode compartment. In this state, the cathode consists of mostly neutral COT moieties, with some COT anion moieties forming, and also some COT dianion moieties forming.
Figure 5:
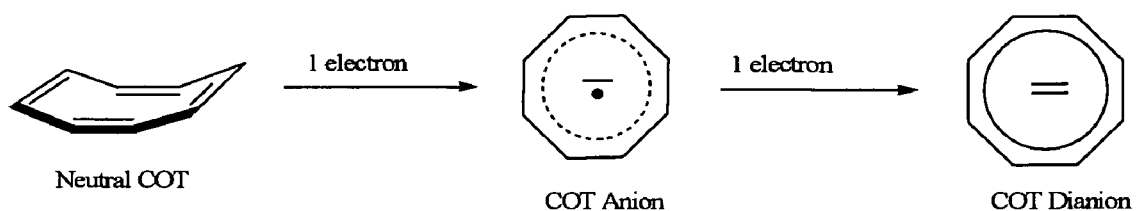
FIG. 5 shows the reversible two-step electron acceptance process in the forward direction whereby neutral COT accepts one electron forming a COT Anion and then reversibly accepts a second electron forming a COT Dianion.
Figure 6:
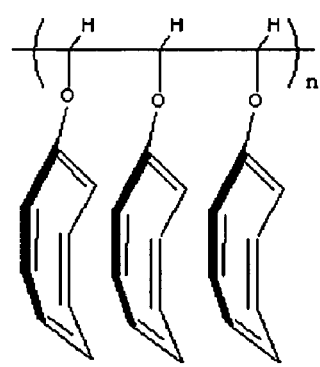
FIG. 6 shows the tub conformation of the COT moieties in a version of poly-alkoxycyclooctatetraene.

The electrochemical cell of the present invention includes a cathode, which includes a molecule, where the molecule contains at least one cyclooctatetraene ("COT") moiety; an anode; and where the anode and cathode are separated by an electrolyte.

Herein, the COT moiety may be described as an eight carbon mono-cyclic ring wherein all eight carbons are covalently linked to two adjacent carbons forming the eight member ring and where each of the eight cyclic ring carbons will additionally have one covalent bond to exactly one other atom apiece, where said one other atom may be a proton, deuterium, boron, carbon, nitrogen, oxygen, silicon, phosphorus, sulfur, a halogen, or germanium, and where said one other atom is a boron, carbon, nitrogen, oxygen, silicon, phosphorus, germanium, or sulfur, said one other atom may be additionally covalently bonded to one or more atoms comprised of proton, deuterium, boron, carbon, nitrogen, oxygen, silicon, phosphorus, sulfur, a halogen, or germanium, but where said one other atom is nitrogen, it may not additionally be covalently bonded to two oxygen atoms, and where said one other atom is oxygen, it may not additionally be covalently bonded to another oxygen atom. These latter two exceptions, which may be succinctly described as nitro-substituted cyclooctatetraenes, and peroxide-substituted cyclooctatetraenes, respectively, are explosion hazards.

Neutral COT has eight π-electrons. Because the number of π electrons equals 4n, and n equals 2, the Hückel rule properly predicts that neutral COT is not aromatic. Consequently, the COT ring adopts a non-planar conformation attributed to the Jahn-Teller effect. Though fluxional, it is at an energy minima in a tub-shape conformation. In this state, it is non-aromatic. However, in an electron rich environment, the COT moiety readily accepts an electron, and upon doing so, becomes planar due to the aromatic stabilization. The 4n+2 π-electron system is even more stable, consequently the COT anion radical can accept an additional electron to form the dianion.

The COT dianion is also resilient when faced with thermal insult. The COT dianion is stable to temperatures up to approximately 400° Celsius and does not show significant breakdown until temperatures greater than 650° Celsius are reached. This is due to its aromatic stabilization afforded by its 4n+2 π-electrons (10 π-electrons).

The simplest form of COT used in a cathode assembly is simply represented by a single molecule of COT, or an assembly of COT moieties connected to each other directly via covalent linkages, or by a shared covalently bonded substituent, or where the COT moieties themselves share carbons. Additionally, the COT moieties may be substituted, including annulations. Below are some examples of "simple COT molecules" wherein the molecule contains only one COT moiety per unit molecule. Here, $R_1$, $R_2$, $R_3$, $R_4$, $R_5$, $R_6$, $R_7$, and $R_8$ may be taken to represent substituents outlined above.

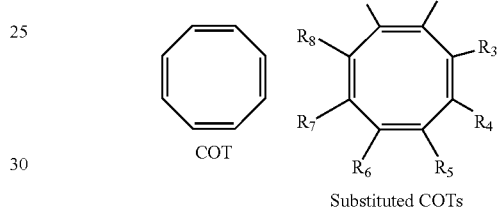

COT

Substituted COTs

Below are some examples of "poly-cyclooctateraenyl molecules" wherein the molecule contains two or more COT moieties per unit molecule that are covalently linked.

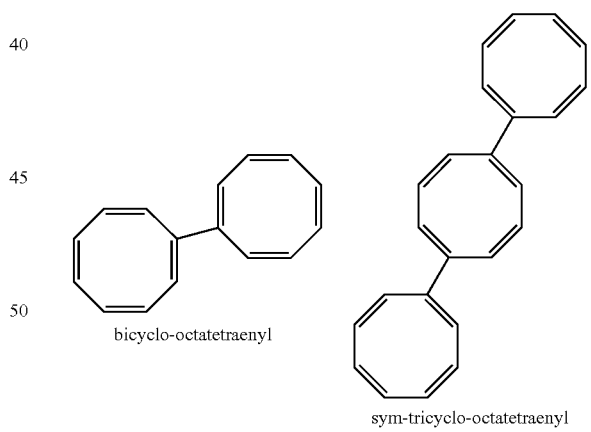

bicyclo-octatetraenyl sym-tricyclo-octatetraenyl

Herein, molecules containing annulated COT moieties may be described wherein the molecule contains at least one COT moiety, at least one additional cyclic ring, and wherein at least two ring carbon atoms are shared between a COT moiety and the additional cyclic ring(s). Said additional cyclic ring(s) may be comprised of a 3-, 4-, 5-, 6-, 7-, or 8-membered cyclic ring(s) comprised of carbon, oxygen, nitrogen, phosphorus, silicon, sulfur, germanium and/or boron atoms. Such molecules may be referred to as "annulated COT molecules."

Below are some examples of annulated COT Molecules. The annulated COT molecules may also have additional substituents.

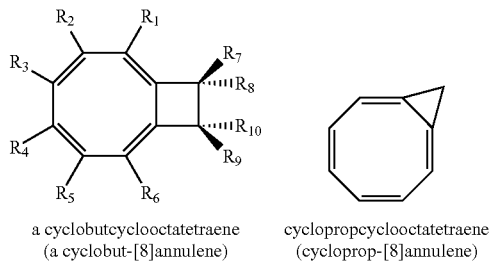

a cyclobutcyclooctatetraene (a cyclobut-[8]annulene)

cyclopropcyclooctatetraene (cycloprop-[8]annulene)

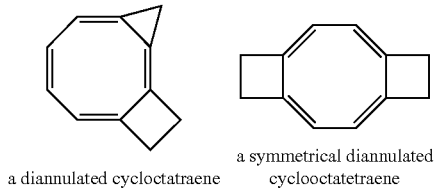

a diannulated cycloctatraene a symmetrical diannulated cyclooctatetraene

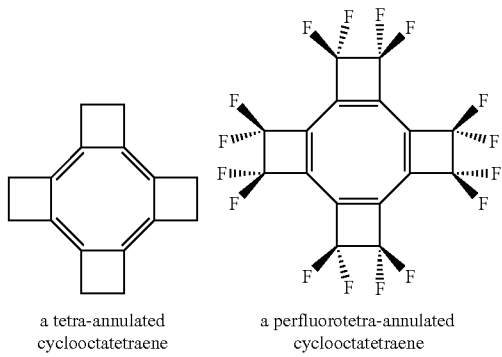

a tetra-annulated cyclooctatetraene a perfluorotetra-annulated cyclooctatetraene

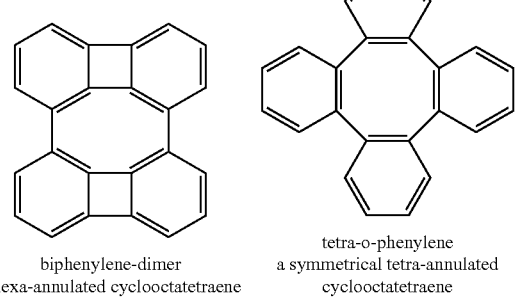

biphenylene-dimer
a hexa-annulated cyclooctatetraene tetra-o-phenylene
a symmetrical tetra-annulated cyclooctatetraene A COT moiety may be annulated by another COT moiety in the special case that the additional ring is eight membered and meets the criteria definition of a COT moiety, above. Such molecules may be referred to as "[8]annulenacenes." Below are some examples of [8]annulenacene molecules.

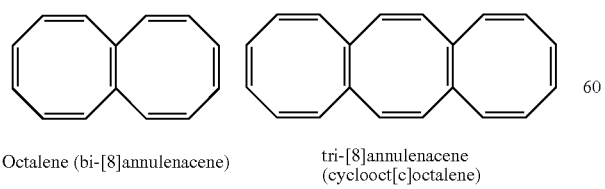

Octalene (bi-[8]annulenacene)

tri-[8]annulenacene (cyclooct[c]octalene)

Herein, annulated COT molecules may contain a cyclic bridge which connects two or more COT moieties. A cyclic bridge is defined as two or more COT moieties, as described above, which are annulated such that the two or more COT moieties share the same annulated ring. That is, the cyclic bridge is a cyclic ring that joins two or more COT moieties. In the special case that the cyclic bridge is comprised solely by joining two or more COT moieties via direct covalent bonds between the COT moieties, said molecules are referred to as "[8]annulenylenes." Below are some examples of [8]annulenylenes. Even a COT moiety may comprise the cyclic bridge in the special case that it is an eight membered ring that meets the criteria definition of COT moiety, described above. For example, tetra-[8]annulenylene, below, contains a total of five COT moieties, as does the bi-[8]annulenylene dimer.

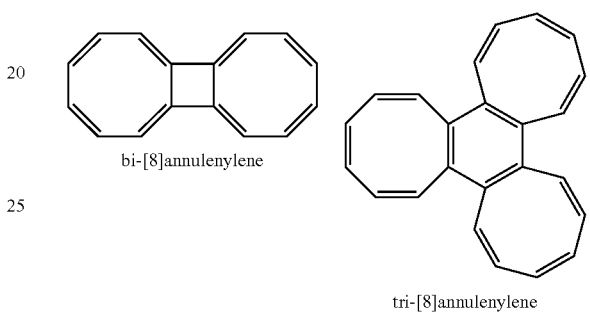

bi-[8]annulenylene tri-[8]annulenylene

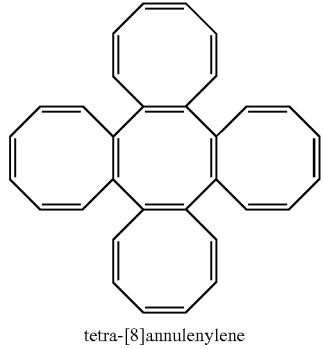

tetra-[8]annulenylene

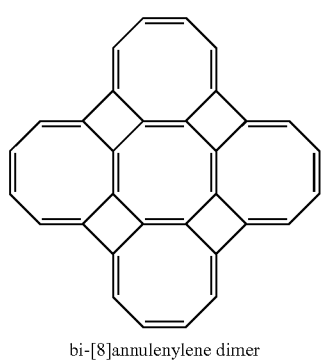

bi-[8]annulenylene dimer

In some cases, such aforementioned cyclic-bridged systems may constitute repeating units of "ladder-like" polymers. Some examples of such polymers are shown, below, where n denotes a number of repeating units.

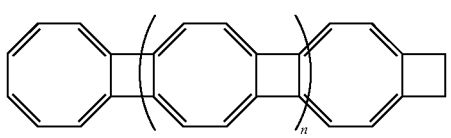

poly-bi-[8]annulenylene

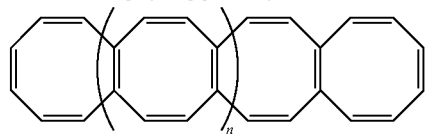

poly-[8]annulenacene

The COT moiety, or any molecule containing at least one COT moiety, may also be incorporated into a polymer structure. For example, as shown below:

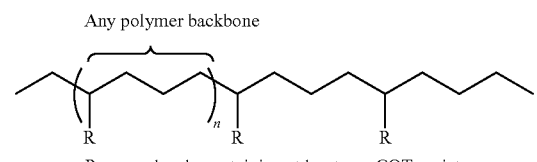

Any polymer backbone

R = a molecule containing at least one COT moiety

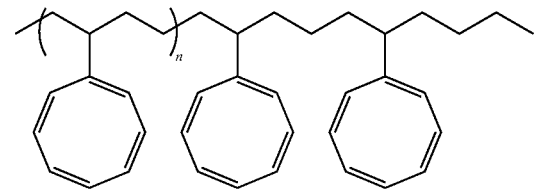

Example of Pendent-type polymer, where COT is the Pendant Group on a polymer backbone

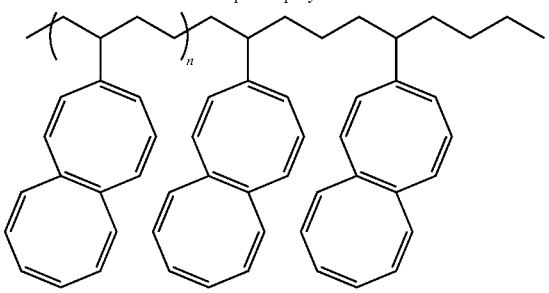

Example of Pendant-type polymer, where Octalene is the Pendant Group on a polymer backbone

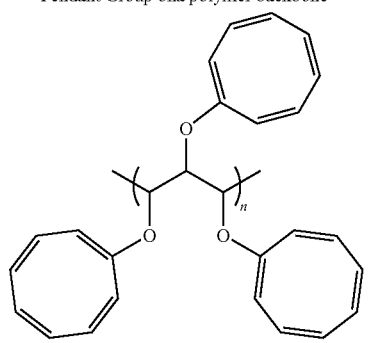

Example of a poly-alkoxycyclooctatetraene

The COT moiety, or any molecule containing at least one COT moiety, may be incorporated into a cyclooctatetraene array. Such an array will incorporate more than three COT moieties. Said moieties will share at least one cyclic bridge between COT moieties. The high molecular weight of such compounds can render them non-soluble, and they may be considered to be nano-materials. Such compounds may be referred to as "COT Array molecules" or "Floor Mosaic molecules".

Below are some examples of Floor Mosaic molecules.

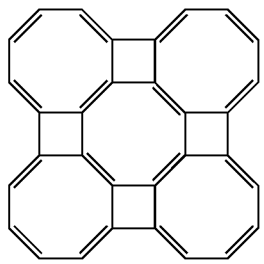

5 COT moieties
bi-[8]annulenylene dimer

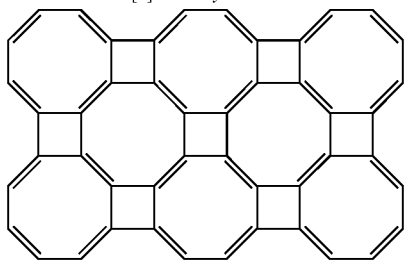

8 COT moities
bi-[8]annulenylene trimer

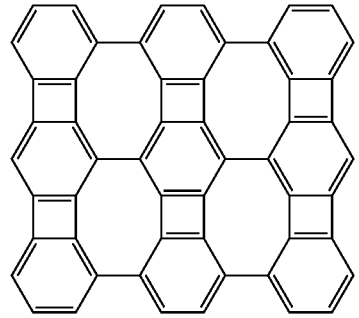

4 COT moities

Any of the above examples may also be substituted with additional substituents and/or patterns.

There are several strategies for obtaining higher voltage potentials and higher specific capacity and energy with this electrochemical cell. Briefly, they are: (1) judicious placement of electron withdrawing substituent(s) upon the COT ring, (2) modifications which make the neutral system more planar and, hence, more anti-aromatic, (3) incorporation of the COT onto a polymer which allows co-facial interactions, and (4) engineered molecules which have joining COT moieties. Additionally, the solvent/electrolyte system utilized can have impact upon voltage potentials.

These strategies discussed above can be used together or separately to design new systems which favor a set of characteristics such as voltage, thermal stability, cycle life, or specific energy. The graphene analogue of this system (graph [8]ene) is theorized to have an approximate yield of >2000 W-hrs/kg, such that >1000 W-hrs/kg could potentially be realized in a secondary electrochemical cell system.

It is useful to compare some of the specific capacities, specific energies, voltage potentials, and general stability for these materials. For example, two COTs can be joined by a simple bridge to form bi-[8]annulenylene.

Below is an example of bi-[8]annulenylene, and its corresponding tetra-anion upon the acceptance of four electrons. The sequence of events which are reversible can be summarized as formation of the anion, formation of the dianion, formation of the tri-anion, and formation of the tetra-anion.

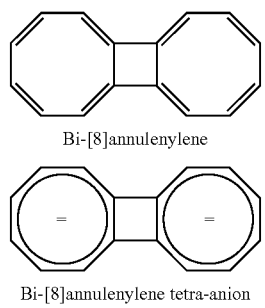

Bi-[8]annulenylene

Bi-[8]annulenylene tetra-anion

The above system has a theoretical specific capacity of approximately 462 A-hrs/kg, and theoretical specific energy of approximately 831 W-hrs/kg. COT alone has a specific capacity of approximately 454 A-hrs/kg and specific energy of approximately 740 W-hrs/kg.

Similarly, octalene (below), which has two fewer carbons than the bi-[8]annulenylene system, can also accept four electrons and has a theoretical specific capacity of approximately 515 A-hrs/kg and specific energy of approximately 927 W-hrs/kg.

Below is an example of octalene, and its corresponding tetra-anion upon the acceptance of four electrons, or two electrons per cyclooctatetraene moiety.

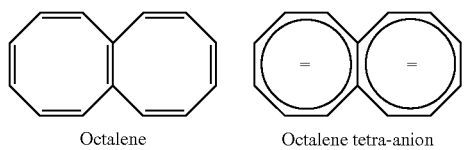

Octalene                Octalene tetra-anion

Even small changes in molecular weight or in voltage can have a sizeable impact upon specific capacity (SC) and specific energy (SE) of the system. A variety of systems employing said strategy are illustrated below along with their respective approximate specific capacities (SC) and approximate specific energies (SE) based upon measurement and calculation.

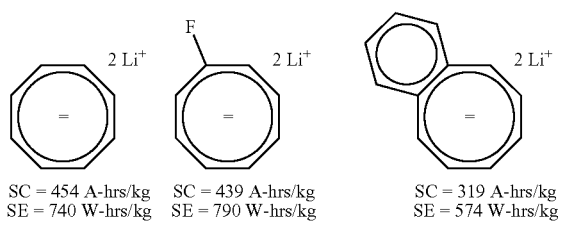

SC = 454 A-hrs/kg    SC = 439 A-hrs/kg    SC = 319 A-hrs/kg
SE = 740 W-hrs/kg    SE = 790 W-hrs/kg    SE = 574 W-hrs/kg

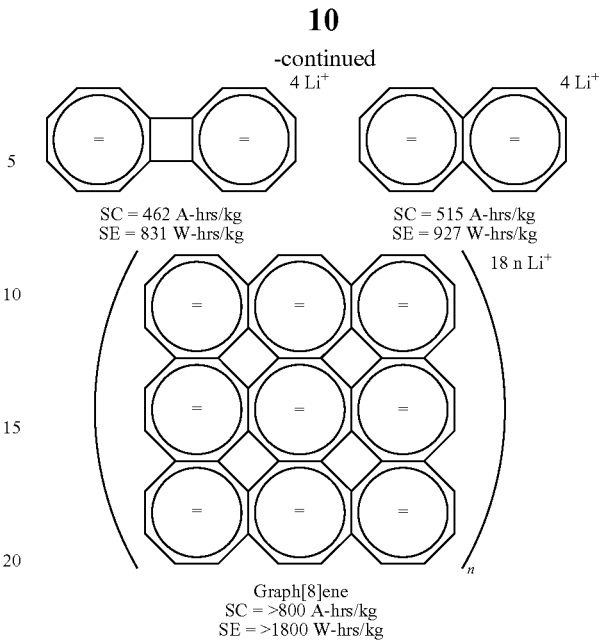

SC = 462 A-hrs/kg         SC = 515 A-hrs/kg
SE = 831 W-hrs/kg         SE = 927 W-hrs/kg Graph[8]ene
SC = >800 A-hrs/kg
SE = >1800 W-hrs/kg The examples, above, are illustrated in their fully reduced forms, as they would occur in a fully discharged electrochemical cell, where lithium comprises the anode (or lithium-ion as the anode). They are (top, left to right) cyclooctatetraene (COT), fluoro-cyclooctatetraene, (middle, left to right) benzo-cyclooctatetraene, bi-[8]annulenylene, (bottom, left to right) octalene, and a novel cyclooctatetraene system array currently designated as graph[8]ene.

It will be understood that various changes can be made in the form details, arrangement, and proportions of the various parts without departing from the spirit and scope of the present invention.

The invention claimed is:

1. An electrochemical cell comprising:
   a cathode, including a molecule, said molecule containing at least one cyclooctatetraene moiety wherein said cyclooctatetraene moiety is an eight carbon atom cyclic ring wherein said carbon atoms are each covalently bonded to one other atom wherein said other atoms are a proton, deuterium, boron, carbon, nitrogen, oxygen, silicon, phosphorus, halogen, or germanium;
   an anode; and
   an electrolyte separating said cathode from said anode.

2. The electrochemical cell of claim 1 wherein said other atoms are additionally covalently bonded to one or more additional atoms.

3. The electrochemical cell of claim 2 wherein said one or more additional atoms are comprised of proton, deuterium, boron, carbon, nitrogen, oxygen, silicon, phosphorus, a halogen, germanium, or any combination thereof, however, where said one other atom is nitrogen, it will not be additionally covalently bonded to two oxygen atoms, and where said one other atom is oxygen, it will not be additionally covalently bonded to another oxygen atom.

4. An electrochemical cell comprising:
   a cathode, including a molecule, said molecule containing at least one cyclooctatetraene moiety which is incorporated into a polymer structure wherein said cyclooctatetraene moiety is an eight carbon atom cyclic ring wherein said carbon atoms are each covalently bonded to one other atom wherein said other atoms are a proton, deuterium, boron, carbon, nitrogen, oxygen, silicon, phosphorus, halogen, or germanium;
an anode; and
an electrolyte separating said cathode from said anode.

5. The electrochemical cell of claim 4 wherein said other atoms are additionally covalently bonded to one or more additional atoms.

6. The electrochemical cell of claim 5 wherein said one or more additional atoms are comprised of proton, deuterium, boron, carbon, nitrogen, oxygen, silicon, phosphorus, a halogen, germanium, or any combination thereof, however, where said one other atom is nitrogen, it will not be additionally covalently bonded to two oxygen atoms, and where said one other atom is oxygen, it will not be additionally covalently bonded to another oxygen atom.

7. The electrochemical cell of claim 4 wherein said molecule containing at least one cyclooctatetraene moiety is a monomer of said polymer wherein said cyclooctatetraene moiety is an eight carbon atom cyclic ring wherein said carbon atoms are each covalently bonded to one other atom wherein said other atoms are a proton, deuterium, boron, carbon, nitrogen, oxygen, silicon, phosphorus, halogen, or germanium.

8. The electrochemical cell of claim 7 wherein said other atoms are additionally covalently bonded to one or more additional atoms.

9. The electrochemical cell of claim 8 wherein said one or more additional atoms are comprised of proton, deuterium, boron, carbon, nitrogen, oxygen, silicon, phosphorus, a halogen, germanium, or any combination thereof, however, where said one other atom is nitrogen, it will not be additionally covalently bonded to two oxygen atoms, and where said one other atom is oxygen, it will not be additionally covalently bonded to another oxygen atom.

10. An electrochemical cell comprising:
a cathode, including a molecule, said molecule containing at least one cyclooctatetraene moiety which is annulated by at least one additional cyclic ring wherein said cyclooctatetraene moiety is an eight carbon atom cyclic ring wherein said carbon atoms are each covalently bonded to one other atom wherein said other atoms are a proton, deuterium, boron, carbon, nitrogen, oxygen, silicon, phosphorus, halogen, or germanium;
an anode; and
an electrolyte separating said cathode from said anode.

11. The electrochemical cell of claim 10 wherein said other atoms are additionally covalently bonded to one or more additional atoms.

12. The electrochemical cell of claim 11 wherein said one or more additional atoms are comprised of proton, deuterium, boron, carbon, nitrogen, oxygen, silicon, phosphorus, a halogen, germanium, or any combination thereof, however, where said one other atom is nitrogen, it will not be additionally covalently bonded to two oxygen atoms, and where said one other atom is oxygen, it will not be additionally covalently bonded to another oxygen atom.

13. The electrochemical cell of claim 10 wherein said molecule containing at least one cyclooctatetraene moiety is incorporated into a polymer structure wherein said cyclooctatetraene moiety is an eight carbon atom cyclic ring wherein said carbon atoms are each covalently bonded to one other atom wherein said other atoms are a proton, deuterium, boron, carbon, nitrogen, oxygen, silicon, phosphorus, halogen, or germanium.

14. The electrochemical cell of claim 13 wherein said other atoms are additionally covalently bonded to one or more additional atoms.

15. The electrochemical cell of claim 14 wherein said one or more additional atoms are comprised of proton, deuterium, boron, carbon, nitrogen, oxygen, silicon, phosphorus, a halogen, germanium, or any combination thereof, however, where said one other atom is nitrogen, it will not be additionally covalently bonded to two oxygen atoms, and where said one other atom is oxygen, it will not be additionally covalently bonded to another oxygen atom.

16. The electrochemical cell of claim 13 wherein said molecule containing at least one cyclooctatetraene moiety is a monomer of said polymer wherein said cyclooctatetraene moiety is an eight carbon atom cyclic ring wherein said carbon atoms are each covalently bonded to one other atom wherein said other atoms are a proton, deuterium, boron, carbon, nitrogen, oxygen, silicon, phosphorus, halogen, or germanium.

17. The electrochemical cell of claim 16 wherein said other atoms are additionally covalently bonded to one or more additional atoms.

18. The electrochemical cell of claim 17 wherein said one or more additional atoms are comprised of proton, deuterium, boron, carbon, nitrogen, oxygen, silicon, phosphorus, a halogen, germanium, or any combination thereof, however, where said one other atom is nitrogen, it will not be additionally covalently bonded to two oxygen atoms, and where said one other atom is oxygen, it will not be additionally covalently bonded to another oxygen atom.

19. The electrochemical cell of claim 10 wherein said molecule contains at least two cyclooctatetraene moieties, wherein said additional cyclic ring connects at least two cyclooctatetraene moieties wherein said cyclooctatetraene moiety is an eight carbon atom cyclic ring wherein said carbon atoms are each covalently bonded to one other atom wherein said other atoms are a proton, deuterium, boron, carbon, nitrogen, oxygen, silicon, phosphorus, halogen, or germanium.

20. The electrochemical cell of claim 19 wherein said other atoms are additionally covalently bonded to one or more additional atoms.

21. The electrochemical cell of claim 20 wherein said one or more additional atoms are comprised of proton, deuterium, boron, carbon, nitrogen, oxygen, silicon, phosphorus, a halogen, germanium, or any combination thereof, however, where said one other atom is nitrogen, it will not be additionally covalently bonded to two oxygen atoms, and where said one other atom is oxygen, it will not be additionally covalently bonded to another oxygen atom.

22. The electrochemical cell of claim 19 wherein said molecule containing at least two cyclooctatetraene moieties is incorporated into a polymer structure wherein said cyclooctatetraene moiety is an eight carbon atom cyclic ring wherein said carbon atoms are each covalently bonded to one other atom wherein said other atoms are a proton, deuterium, boron, carbon, nitrogen, oxygen, silicon, phosphorus, halogen, or germanium.

23. The electrochemical cell of claim 22 wherein said other atoms are additionally covalently bonded to one or more additional atoms.

24. The electrochemical cell of claim 23 wherein said one or more additional atoms are comprised of proton, deuterium, boron, carbon, nitrogen, oxygen, silicon, phosphorus, a halogen, germanium, or any combination thereof, however, where said one other atom is nitrogen, it will not be additionally covalently bonded to two oxygen atoms, and where said one other atom is oxygen, it will not be additionally covalently bonded to another oxygen atom.

25. The electrochemical cell of claim 22 wherein said molecule containing at least two cyclooctatetraene moieties is a monomer of said polymer wherein said cyclooctatetraene moiety is an eight carbon atom cyclic ring wherein said carbon atoms are each covalently bonded to one other atom wherein said other atoms are a proton, deuterium, boron, carbon, nitrogen, oxygen, silicon, phosphorus, halogen, or germanium.

26. The electrochemical cell of claim 25 wherein said other atoms are additionally covalently bonded to one or more additional atoms.

27. The electrochemical cell of claim 26 wherein said one or more additional atoms are comprised of proton, deuterium, boron, carbon, nitrogen, oxygen, silicon, phosphorus, a halogen, germanium, or any combination thereof, however, where said one other atom is nitrogen, it will not be additionally covalently bonded to two oxygen atoms, and where said one other atom is oxygen, it will not be additionally covalently bonded to another oxygen atom.

28. The electrochemical cell of claim 19 wherein said molecule contains at least three cyclooctatetraene moieties, wherein said cyclooctatetraene moieties are incorporated into a Floor Mosaic pattern whereby said cyclooctatetraene moieties are connected via at least one said additional cyclic ring to at least one other said cyclooctatetraene moiety wherein said cyclooctatetraene moiety is an eight carbon atom cyclic ring wherein said carbon atoms are each covalently bonded to one other atom wherein said other atoms are a proton, deuterium, boron, carbon, nitrogen, oxygen, silicon, phosphorus, halogen, or germanium.

29. The electrochemical cell of claim 28 wherein said other atoms are additionally covalently bonded to one or more additional atoms.

30. The electrochemical cell of claim 29 wherein said one or more additional atoms are comprised of proton, deuterium, boron, carbon, nitrogen, oxygen, silicon, phosphorus, a halogen, germanium, or any combination thereof, however, where said one other atom is nitrogen, it will not be additionally covalently bonded to two oxygen atoms, and where said one other atom is oxygen, it will not be additionally covalently bonded to another oxygen atom.

31. A cathode, comprising:
a molecule, wherein the molecule comprises a cyclooctatetraene moiety wherein said cyclooctatetraene moiety is an eight carbon atom cyclic ring wherein said carbon atoms are each covalently bonded to one other atom wherein said other atoms are a proton, deuterium, boron, carbon, nitrogen, oxygen, silicon, phosphorus, halogen, or germanium.

32. The cathode of claim 31, wherein said other atoms are additionally covalently bonded to one or more additional atoms.

33. The cathode of claim 32, wherein said additional atoms are comprised of a proton, deuterium, boron, carbon, nitrogen, oxygen, silicon, phosphorus, a halogen, germanium, or any combination thereof, however, where said one other atom is nitrogen, it will not be additionally covalently bonded to two oxygen atoms, and where said one other atom is oxygen, it will not be additionally covalently bonded to another oxygen atom.

34. The cathode of claim 31, wherein said molecule is incorporated into a polymer structure.

35. The cathode of claim 34, wherein said molecule is a monomer of said polymer.

36. The cathode of claim 31, wherein said cyclooctatetraene moiety is annulated by at least one additional cyclic ring.

37. The cathode of claim 31, wherein said molecule comprises at least two cyclooctatetraene moiety.

38. The cathode of claim 31, wherein said molecule comprises at least three cyclooctatetraene moieties, wherein said cyclooctatetraene moieties are incorporated into a Floor Mosaic pattern whereby said cyclooctatetraene moieties are connected via at least one additional cyclic ring to at least one other cyclooctatetraene moiety.

* * * * *